Nov. 2, 1943.  J. GALKIN  2,333,421
DUPLEX TRIMMING MECHANISM
Filed Nov. 14, 1941  6 Sheets-Sheet 1

JOSEPH GALKIN
INVENTOR
BY Joseph Blacker
ATTORNEY

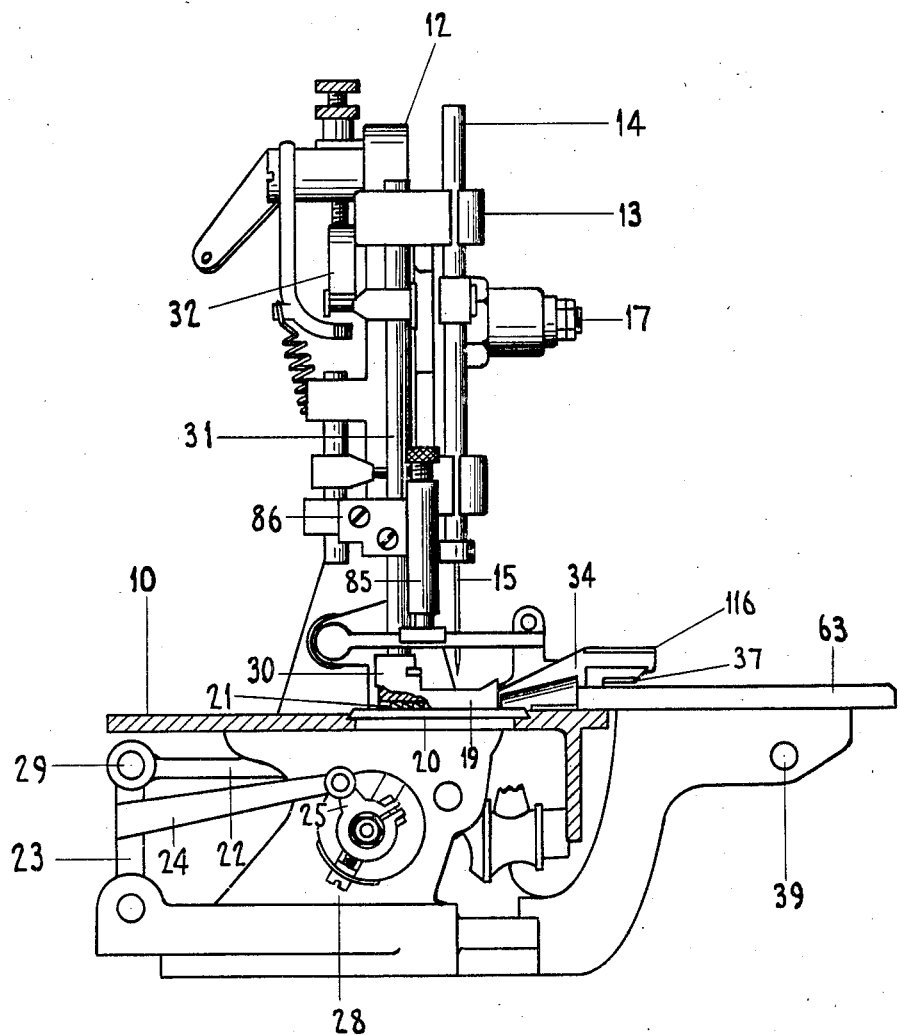

Nov. 2, 1943.        J. GALKIN        2,333,421
DUPLEX TRIMMING MECHANISM
Filed Nov. 14, 1941        6 Sheets-Sheet 3
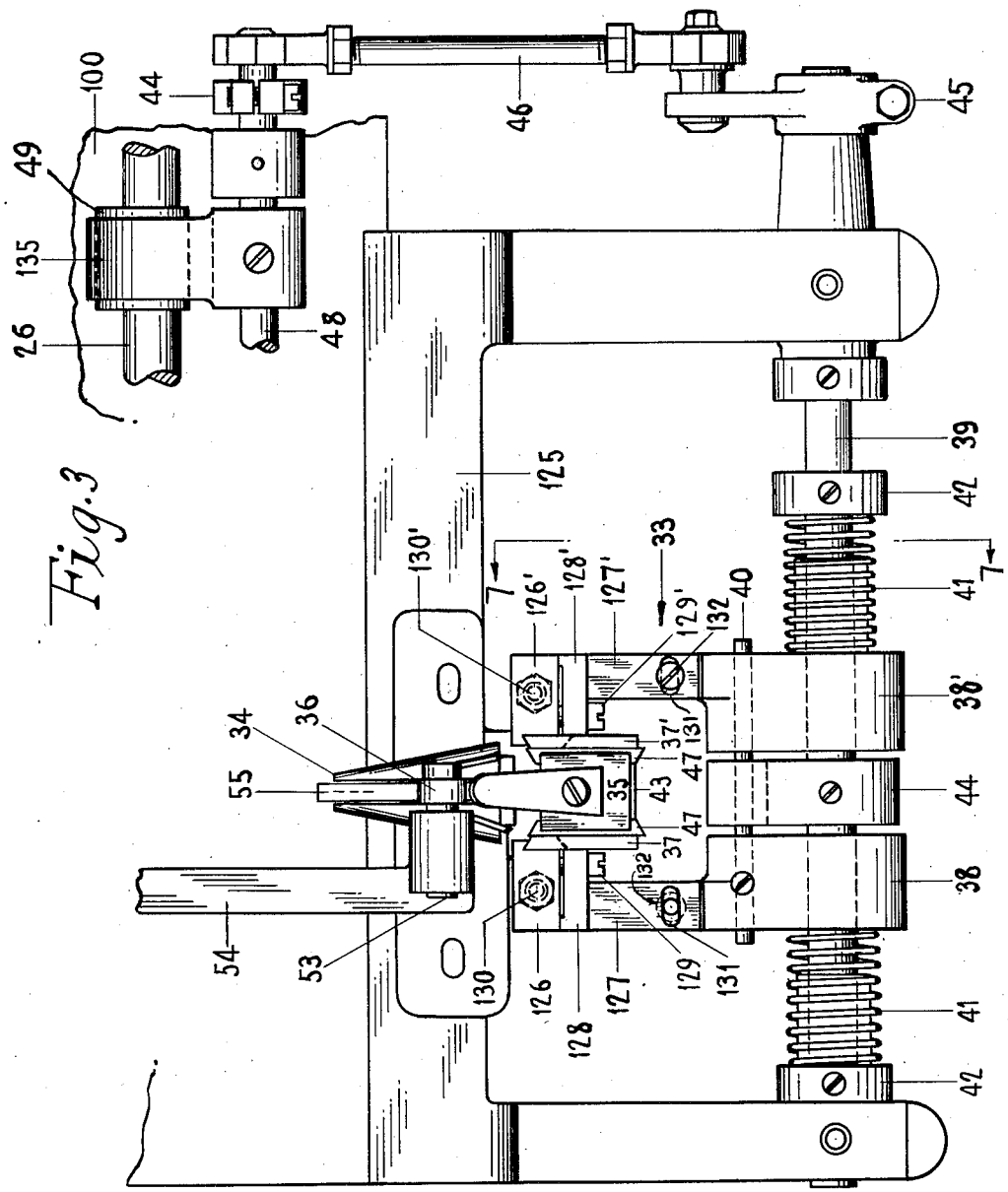
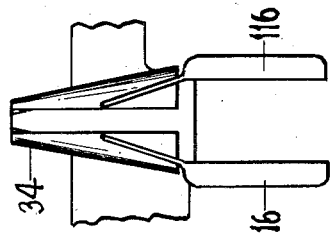
JOSEPH GALKIN
INVENTOR
BY Joseph Blacker
ATTORNEY

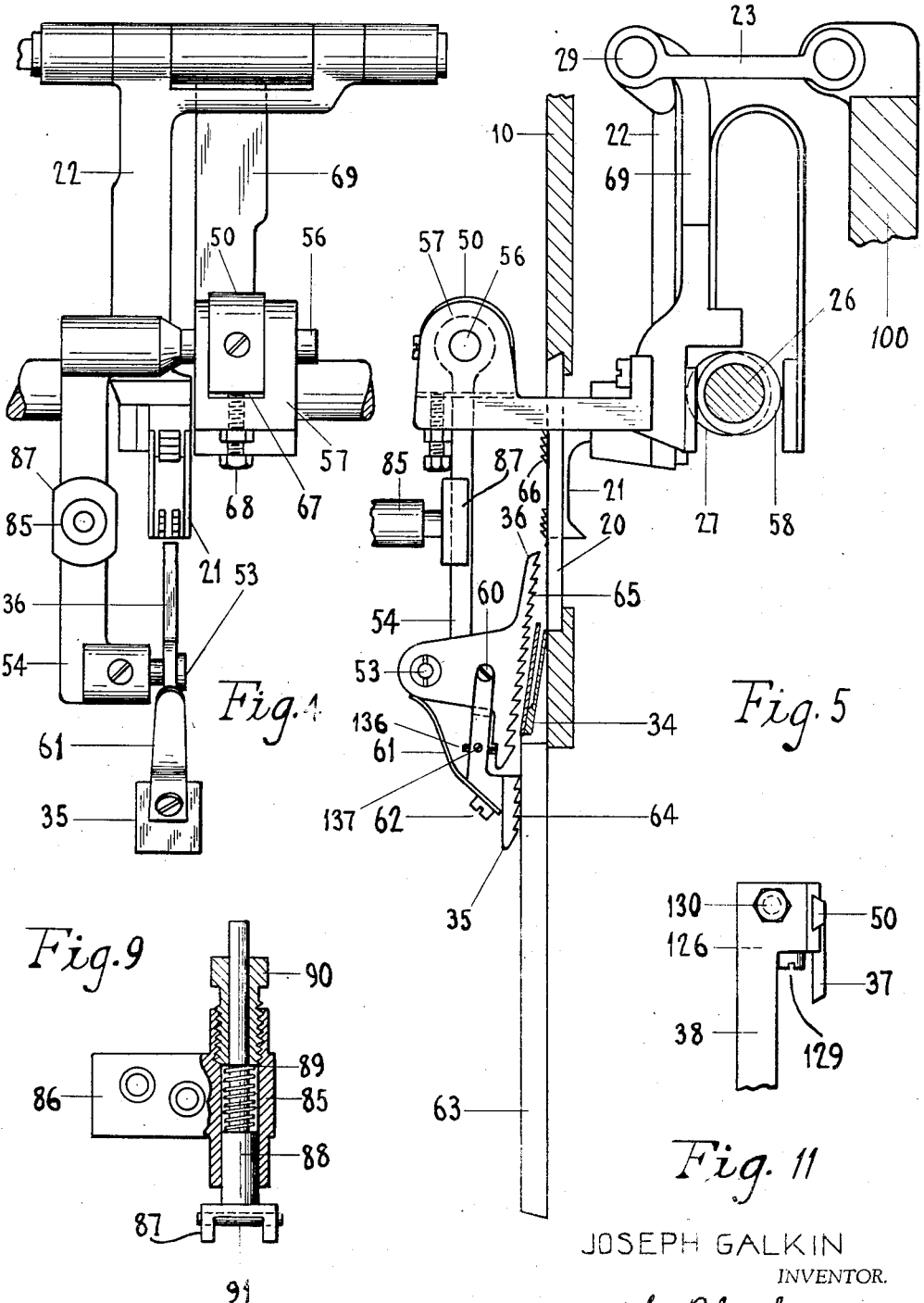

Nov. 2, 1943.  J. GALKIN  2,333,421
DUPLEX TRIMMING MECHANISM
Filed Nov. 14, 1941  6 Sheets-Sheet 5
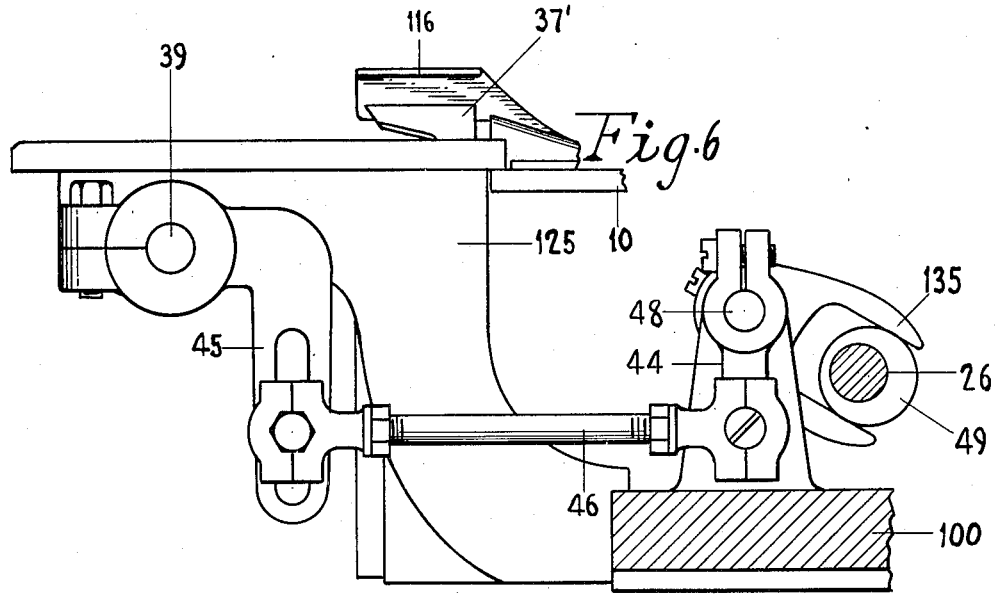
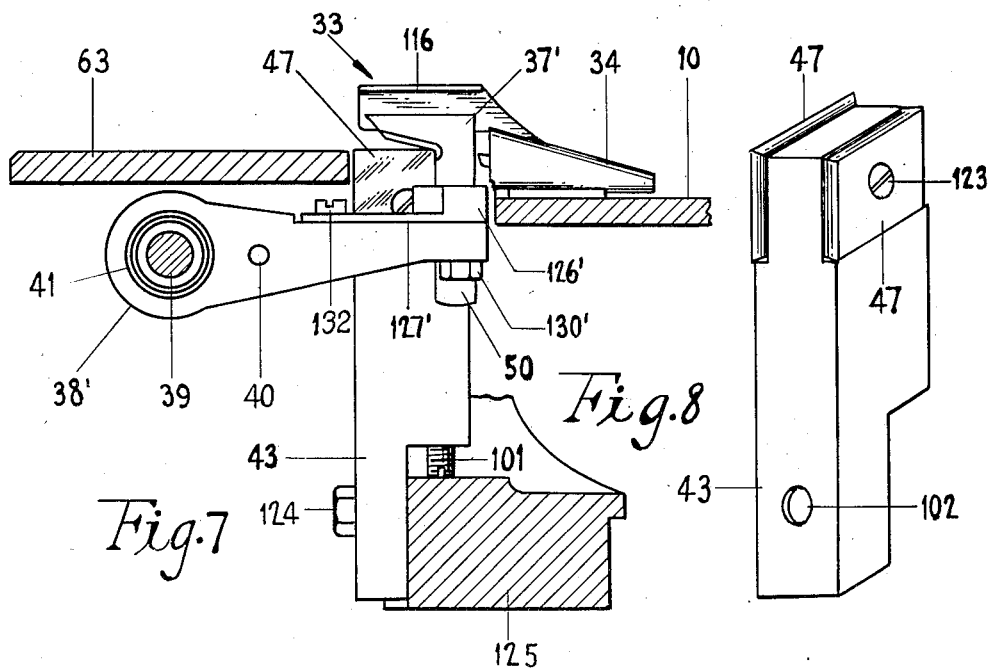
JOSEPH GALKIN
*INVENTOR*
BY *Joseph Blacker*
*ATTORNEY*

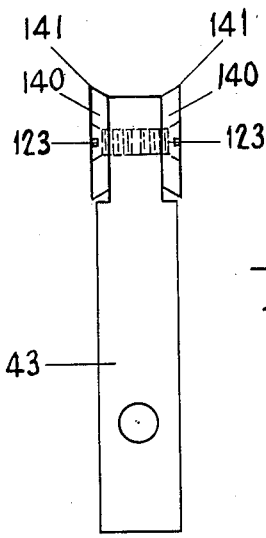
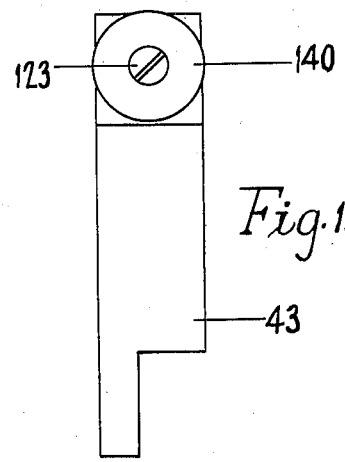
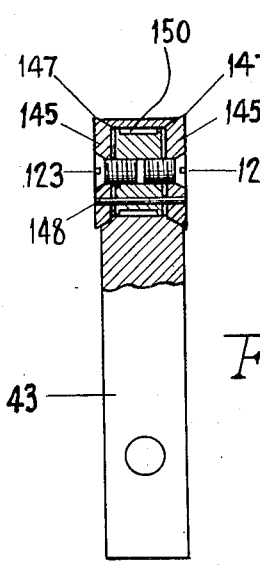
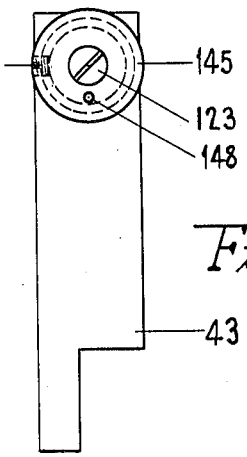

Patented Nov. 2, 1943

2,333,421

UNITED STATES PATENT OFFICE 2,333,421

DUPLEX TRIMMING MECHANISM

Joseph Galkin, New York, N. Y.

Application November 14, 1941, Serial No. 419,220

2 Claims. (Cl. 164—17.5)

This invention relates to improvements in duplex trimming mechanism, and particularly to its application to sewing machines whereby belt loops for trousers are automatically produced in a single operation.

This application is a continuation in part of my copending abandoned application, Serial No. 374,923, filed January 17, 1941, for Duplex trimming mechanism.

An object of this invention is to provide a combined four-motion type top feed-dog and two sets of cutting blades respectively mounted at each side of said top feed-dog and adapted to simultaneously cut fabric such as scrap material to predetermined width and to feed the trimmed fabric strip.

Another object of this invention is to provide a four-motion top feed-dog which is resiliently mounted for up and down movement, so as to automatically adapt itself for feeding fabrics of different thicknesses.

Another object of this invention is to provide a duplex trimming mechanism comprising two fixed shear blades and two movable shear blades, and to pivotally and adjustably mount the movable shear blades so that point contact may be had between the shear blades indefinitely.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 2 is an end view of the sewing machine, partly in section.

Figure 3 is a top plan view, on an enlarged scale, of a bracket on which the duplex trimming mechanism is mounted, the work supporting base being removed.

Figure 4 is a fragmentary plan view showing reciprocatory four-motion top feed mechanism for feeding the fabric.

Figure 5 is a fragmentary side view of the feeding mechanism shown in Figure 4.

Figure 6 is an end view of the duplex trimming mechanism, looking in the direction of the vibratable connection.

Figure 7 is a cross-sectional view, the section being taken as on line 7—7 in Figure 3.

Figure 8 is a perspective view of a set of stationary shear blades.

Figure 9 is a cross-sectional view of an assembled top feed pressure bracket and plunger for resiliently downpressing the top feed dogs.

Figure 10 is a plan view of a folder having finger shields attached thereto.

Figure 11 is a fragmentary bottom view of a movable blade carrier.

Figure 12 is an end view of a modified stationary shear blade assembly having two individually adjustable disk-shaped cutting wheels.

Figure 13 is a side view of the stationary shear blade assembly shown in Figure 12.

Figure 14 is an end view of another modification of shear blade assembly, partly broken away to show two disk-shaped cutting wheels which are adjustable as a unit jointly with an intermediate alining disk.

Figure 15 is a side view of the two cutting wheels and the alining disk shown in Figure 14.

Figure 16 is a side view of the shear blade assembly shown in Figure 14.

Figure 1:
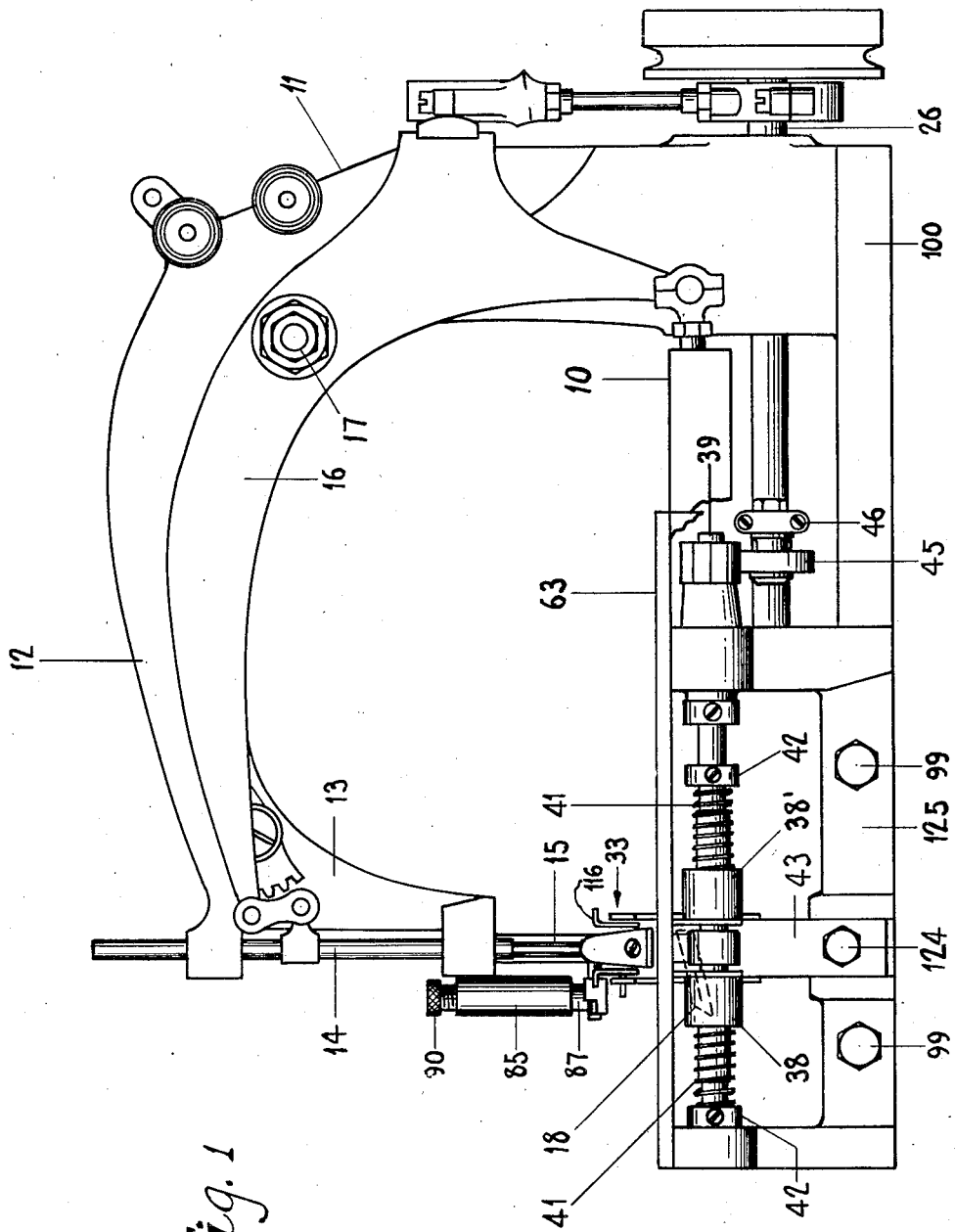
Figure 1 is a front elevation of a sewing machine having my trimming mechanism applied thereto.

In the illustrated embodiment of the invention, the numeral 10 indicates the work supporting base of a sewing machine embodying my invention and which comprises the usual standard 11, having an overhanging arm 12 with a head 13 at its free end. In the head 13 is journalled the usual reciprocatory needle-bar 14 carrying two spaced needles 15. The needle-bar is reciprocated by a lever 16 mounted on a pivot shaft 17. A looper 18 is oscillated and cooperates with the two spaced needles. The looper thread interlocks with the needle threads to form stitching as is well known in the sewing machine art. The material worked upon is held down by a presserfoot 19 resting on a needle-plate 20 secured to the work supporting base 10.

Projecting through the needle-plate 20 is a lower feed-dog 21. The feed-dog 21 is carried by a feed-bar 22 attached to a feed rocker 23. The feed rocker 23 is oscillated by an arm 24 connected in the usual manner to a pitman 25 on the forward end of the main shaft 26. The feed-bar 22 is raised and lowered by an eccentric 27 on the main shaft 26.

By actuating a screw 28, Figure 3, the crank 25 is caused to move to or away from the center of the main shaft 26 and causes the arm 24 to impart a larger or smaller swing to a stub shaft 29 and feeding movements to the feed-dog 21.

The foot 19 has its shank 30 secured to the lower end of a presser bar 31 which is supported in the head 13 in the usual manner. Pressure is maintained upon the foot 19 by a leaf spring 32 pressing upon the presser-bar 31.

This invention is particularly directed to a duplex trimming mechanism 33 for trimming two fabric edges so as to prepare a strip of predetermined width. The trimmed strip is fed to a folder 34 for folding the strip into belt loop form and directing the same to the stitching mechanism for stitching the belt loop. The invention also provides a top feed-dog 35 for feeding the strip to and through the trimming mechanism. A top feed-dog 36 is shown for feeding the cut strip to and through the folder and to the stitching machine. The top feed-dogs 35 and 36 are operated in timed relation with the lower feed-dog 21. The folder 34 and the top feed-dog 36 are fully disclosed in my said application for belt loop sewing machine, Serial No. 340,577, filed June 14, 1940, Patent No. 2,262,547.

The forward top feed-dog 35 feeds the scrap fabric to and through movable shear blades 37, 37' held in carriers 38, 38'. The movable blade carriers are slidably mounted on a rock shaft 39. The carriers 38 are keyed to the shaft 39 by a key 40 and are resiliently pressed by coil springs 41 in the direction of the stationary shear blades 47. The springs 41 react against collars 42 fixedly mounted on the shaft 39. The stationary shear blades 47 are held in properly spaced cutting relation by being held in a fixed carrier 43 of the desired width. The movable shear blades 37, 37' thus cooperate with the stationary shear blades 47 to cut a fabric strip of predetermined width.

The movable shear blades 37, 37' are given substantially vertical movements by the carriers 38, 38'. The carriers slidably engage the elongated key 40. The key is held in fixed parallel relation with the rock shaft 39 by being slidably held in an arm 44 fixed to the shaft. An arm 45 is fixed to one end of the shaft 39 and is pivotally connected to a ball-joined vibrating connecting rod 46 operated by an arm 44 on a rock shaft 48. The rock shaft 48 actuates the connection 46 and the rock shaft 39. The rock shaft 39 actuates the movable shear blades 37, 37' once for each revolution of the main shaft 26. Shaft 48 is rocked by eccentric 49 on shaft 26.

As shown in Figure 4, the rearward top feed-dog 36 is elongated and serves for feeding the folded strip of fabric through the folder 34 and to the central portion of the feed-dog 21. The feed-dog 36 is mounted on a pivot 53 at one end of a top feed bracket 54 and adapted for reciprocating motion in a linear passage 55 in the upper portion of the folder 34. The top feed bracket 54 is mounted on a pivot 56 at the upper end of a feed-bar extension 57 which is raised and lowered by an eccentric 58 mounted on the main shaft 26 (Figure 5).

As shown in Figures 4 and 5, the top feed-dog 35 for feeding the scrap fabric to the shear blades 37, 37' is pivotally mounted on a pin 60 passing through the top feed-dog 36. The top feed-dog 35 is positioned for movement between the movable blades 37, 37'. A leaf spring 61 secured at one end by a screw 62 to the feed-dog 35 and in tensioned engagement at its free upper end with the upright front wall of the top feed-dog 36 serves to press the top feed-dog 35 against the upper surface of the blade carrier 43 for the stationary blades 47, and in pressure contact with the work. The upper surface of the blade carrier 43 is at the level of a raised front extension 63 of the work supporting base 10 (Figure 2).

As shown in Figure 5, the top feed-dog 35 has feeding teeth 64 extending across the entire lower surface thereof. The teeth 64 face in the same direction as the teeth 65 on the top feed-dog 36, and in the same direction as the teeth 66 on the lower feed-dog 21.

The top feed bracket 54 is normally maintained in a substantially horizontal position by means of a collar 50 fixed to the pivot 56 and having a vertical extension 67 resting against a horizontally adjustable screw 68 in the feed-bar extension 57. The feed-bar extension 57 is carried by a feed-bar 69 attached to the feed rocker 23, and is caused to move up and down by the eccentric 58 on the main shaft 26.

I have provided a resilient means for down-pressing the top feed-dog 36 into engagement with the folded belt-loop fabric and so that the teeth of the top feed-dog will be adapted for feeding the belt loop fabric through the folder and directly to the needles. This resilient means comprises a tubular guide or housing 85 secured to the head 13 by a flange 86. As shown in Figure 9, a top feed plunger 87 has a collar 88 on which a coil spring 89 seats and reacts against an adjusting screw 90. The lower end of the plunger 87 is thus adapted to resiliently downpress the bracket 54 and the top feed-dog 36. The contacting portion of the end 87 houses a roller 91.

When the sewing machine is in operation, the top feed bracket 54 is actuated up and down by the eccentric 58 and forward and backward by the feed-rocker 23. The attached top feed-dog 36 and the pivotally mounted top feed-dog 35 thus have 4-motion feeding movements imparted thereto, similar to the 4-motion feeding movements of the feed-dog 21. The lower feed-dog feeds the folded fabric through the presser-foot 19 by pressure contact with the lower surface of said fabric.

I have provided a knife shield for the fingers of the operator. The shield comprises two angular arms 116 which are integral with the folder 34 and extend forwardly above and between the movable blades 37, 37'. The reriprocable feed-dog 35 has clearance on each side thereof to operate freely between the said angular shield arms.

Figure 8 shows stationary shear blades 47 made in the form of a centrally supported square, with four cutting edges. Each blade may thus be turned ninety degrees about a pivot screw 123 to bring an interchangeable cutting edge into the upper cutting position. The overall width of an assembled set of blades and blade carrier 43 may be varied to suit different widths of belt loops. The carrier 43 has been fastened by a screw 124 to an elongated bracket 125 in which the shaft 39 is mounted.

As shown in Figures 3, 7 and 11, the movable shear blades 37, 37' are secured in housings 126, 126', each having elongated arms 127, 127' extending therefrom. Clamping plates 128, 128' are fastened by screws 129, 129' to the housings. As best shown in Figure 11, the stem portions 50 of the movable blades are of trapezoidal cross-section. The housings and the clamping plates have inclined side walls engageable with the inclined side walls of the said stems.

The movable blades may, by adjusting the screws 129, 129', be raised or lowered into the desired cutting position in relation to the stationary blades. The housings 126, 126' have been mounted in pivotal relation with the carriers 38, 38' by screws 130, 130' threaded into the housings and having their body portions passing freely through clearance apertures in the carriers. It will be noted that the arms 127, 127' have elongated transverse slots 131 serving to receive screws 132 in threaded engagement with the carriers. It is thus possible to adjust the housings 126, 126' and the movable blades 37, 37' on the carriers 38, 38' in angular relation with the stationary blades 47, 47' and when the screw 132 is tightened by rotation into the carrier 38', the housing 126' is locked to the carrier and this adjustment provides point contact between the blades.

As shown in Figure 1, the bracket 125 is secured by bolts 99 to the baseplate 100 of the sewing machine. As shown in Figure 7, the fixed blade carrier 43 has a vertically positioned screw 101 threaded therein and resting on the bracket 125. By adjusting the screw 101, it is possible to raise or lower the blades 47, 47'. The screw 124 passes through a vertically elongated aperture 102 in the carrier 43 to permit this vertical adjustment.

As shown in Figures 3 and 6, it will be seen that when the looper eccentric 49 on the main shaft 26 actuates the looper eccentric fork 135, that the looper rocker vibrating shaft 48 vibrates the arm 44, the vibrating connection 46, the arm 45, the rock shaft 39 and the movable blades 37, 37'.

As shown in Figure 5, I have provided a pin 136 vertically adjustable in the feed-dog 35 by means of a screw 137. The pin 136 rests on a horizontal shoulder in the feed-dog 36 and makes it possible to adjust the height of the feed-dog 35 above the base extension 63 according to the thickness of the fabric employed.

Figures 12 and 13 show stationary shear devices 140 made in the form of disk-shaped wheels having circular side faces with sharp bevelled peripheral edges 141 and secured by screws 123 to the fixed carrier 43. The shear wheels 140 are adapted to cooperate with the movable shear blades 37, 37' held in the carriers 38, 38'.

Each shear wheel 140 may thus be turned in steps of about one sixteenth of an inch about the screws 123 to bring a very large number of fractions of the cutting edges into the upper cutting position.

Figures 14 to 16 inclusive show modified stationary shear devices or cutting wheels 145 which are adjustable as a unit jointly with an intermediate alining disk 146. The cutting wheels 145 have circular side faces with sharp bevelled peripheral edges 147 and secured by screws 123 to the annular disk 146. The shear wheels 145 are adapted to cooperate with the movable shear blades 37, 37' held in the carriers 38, 38'.

The shear wheels 145 are spaced apart by the annular alining disk 146 which has a pin 148 extending from opposite faces thereof and which is adapted to enter into a through aperture in each of the said cutting wheels 145.

The two shear wheels 145 may thus be turned jointly in steps of about one sixteenth of an inch about the screws 123 to bring a very large number of fractions of the cutting edges into the upper cutting position.

A screw 149 threaded into the upper portion of the carrier 43 is positioned to enter into the central portion of a cylindrical passage 150 in the said carrier. It is to be noted that the thickness of the disk 146 is such as to cause the bevelled side walls of the wheels 145 to be slightly spaced from bevelled outer edges of the passage 150 and to permit rotation of the joint assembly of the wheels 145 and the disk 146 within said opening unless held fast by the screw 149 pressing against the disk 146. The overall dimension of the assembled stationary blades is greater at the cutting plane or upper level than the overall dimension at the lower level of said blades. This provides a space or clearance below the horizontal cutting edges and provides contact of the movable blades with only the topmost edges of the stationary blades.

In accordance with the patent statutes I have described and illustrated the preferred embodiments of my invention, but it will be understood that various changes and modifications can be made therein without departing from the spirit of the invention as defined by the appended claims.

I claim:

1. In a trimming mechanism for belt loops of the class described, a horizontally positioned cutting plane wherein the trimming occurs upon, two stationary and two coacting movable blades, a carrier for said stationary blades, screw means for vertical adjustment and support of said carrier and said stationary blades relative to said horizontal cutting plane, a rock shaft mounted below said cutting plane, carriers for said movable blades slidably mounted on said rock shaft and being resiliently pressed by coil springs in the direction of said stationary blades, each of said movable blades being secured in a housing, said housings being pivotally mounted on said slidable carriers, each of said movable blade housings having an elongated horizontal extension including an arcuate slot, releasable means in said slidable carriers and passing through said slots and adapted to secure said housings to said slidable carriers, said releasable means permitting pivotal adjustment of said movable blades on said slidably mounted carriers to angular positions in relation to said coacting fixed blades, whereby said coacting blades are caused to forcibly contact solely at single successive points, each of said stationary blades having cutting surfaces peripherally disposed about a central pivot, and having means for manually adjusting said cutting surfaces successively into horizontal cutting positions.

2. In a trimming mechanism for belt loops of the character described, a horizontally positioned cutting plane wherein the trimming occurs upon, two stationary and two coacting movable blades, an upright carrier for said stationary blades, said carrier having a vertically elongated aperture, a screw passing through said aperture and adapted for vertical adjustment and support of said carrier and said stationary blades relative to said horizontal cutting plane, a rock shaft mounted below said cutting plane, carriers for said movable blades slidably mounted on said rock shaft and being resiliently pressed by coil springs in the direction of said stationary blades, each of said movable blades having a stem and being secured in a housing with said stem in vertical position, said housings having releasable cylindrical pivots parallel with said stems and extending freely into cylindrical apertures in said carriers, said housings being pivotally mounted on said slidable carriers solely by rotation about said pivots, each of said movable blade housings having an elongated horizontal extension including an arcuate slot, screws threaded in said slidable carriers and passing through said slots and adapted to secure said housings to said slidable carriers, said screws permitting pivotal adjustment of said movable blades on said slidably mounted carriers to angular positions in relation to said coacting fixed blades, whereby said movable blades are caused to forcibly contact said stationary blades solely at single successive points, each of said stationary blades having cutting surfaces peripherally disposed about a central pivot, said stationary blade carrier having a horizontally positioned cylindrical aperture at its upper end, a cylindrical member rotatably mounted in said aperture, and means for connecting said cylindrical member and said stationary blades whereby both of said stationary blades are adjustable as a unit.

JOSEPH GALKIN.